March 28, 1967     T. F. RISTAU     3,310,961
CONSTANT VELOCITY UNIVERSAL JOINT
Filed Aug. 27, 1965     2 Sheets-Sheet 1

INVENTOR
*Theodore F. Ristau*

BY *Charles R. Engle*
ATTORNEY

March 28, 1967  T. F. RISTAU  3,310,961
CONSTANT VELOCITY UNIVERSAL JOINT
Filed Aug. 27, 1965  2 Sheets-Sheet 2

INVENTOR
*Theodore F. Ristau*

BY *Charles R. Engle*
ATTORNEY

United States Patent Office 3,310,961
Patented Mar. 28, 1967

3,310,961
CONSTANT VELOCITY UNIVERSAL JOINT
Theodore F. Ristau, Saginaw, Mich., assignor to General Motors Corporation, Detroit, Mich., a corporation of Delaware
Filed Aug. 27, 1965, Ser. No. 483,234
8 Claims. (Cl. 64—21)

This invention, in general, relates to universal joints for transmitting torque between two connected shafts and more specifically is of a constant velocity type. Specifically, this invention concerns a universal joint wherein a plurality of rotatable parts such as balls, rollers or sliding blocks are maintained in a plane bisecting the angle between the connected shafts to provide the constant velocity feature and has the further characteristic of being axially movable to provide the slip joint concept.

Constant velocity universal joints having limited axial slip are well known in the art but heretofore have involved a complicated arrangement involving intricate manufacturing processes. With the advent of low profile automobiles, it has become necessary to use a greater number of universal joints in the drive train of a vehicle to allow such design features. Therefore, a constant velocity universal joint structure employing a minimum of parts and utilizing a form that results in ease of manufacture is highly advantageous in a competitive field. These problems have been readily solved by the subject invention as will be apparent from the detailed description of the structure in the following specification.

A first object of this invention is to provide a constant velocity universal joint having a specific positioning of the connecting parts during angulation of the connected shafts.

A further object of the subject invention is to provide a universal joint having a constant velocity during all positions of angulation between the shafts which is assured by utilizing a guide member in relation to a ball stud member.

Another object of the subject invention is the provision of an intermediate member to retain the rotatable connecting members whereby the intermediate member has a specific configuration so that it is readily movable to an angular position while at the same time preventing rotation of the intermediate member.

A still further object of the subject invention is the provision of a stop member upon a ball stud member within a guide member so that the ball stud member can move a specified distance while precisely assuring true positioning of the intermediate member to bisect the angle between the connected shafts.

Another object of the subject invention is the resiliently positioning of the intermediate member whereby it may be axially slipped in either direction to provide the advantageous slip feature.

Other objects will appear in the detailed specification and in the appended claims.

Figure 1:
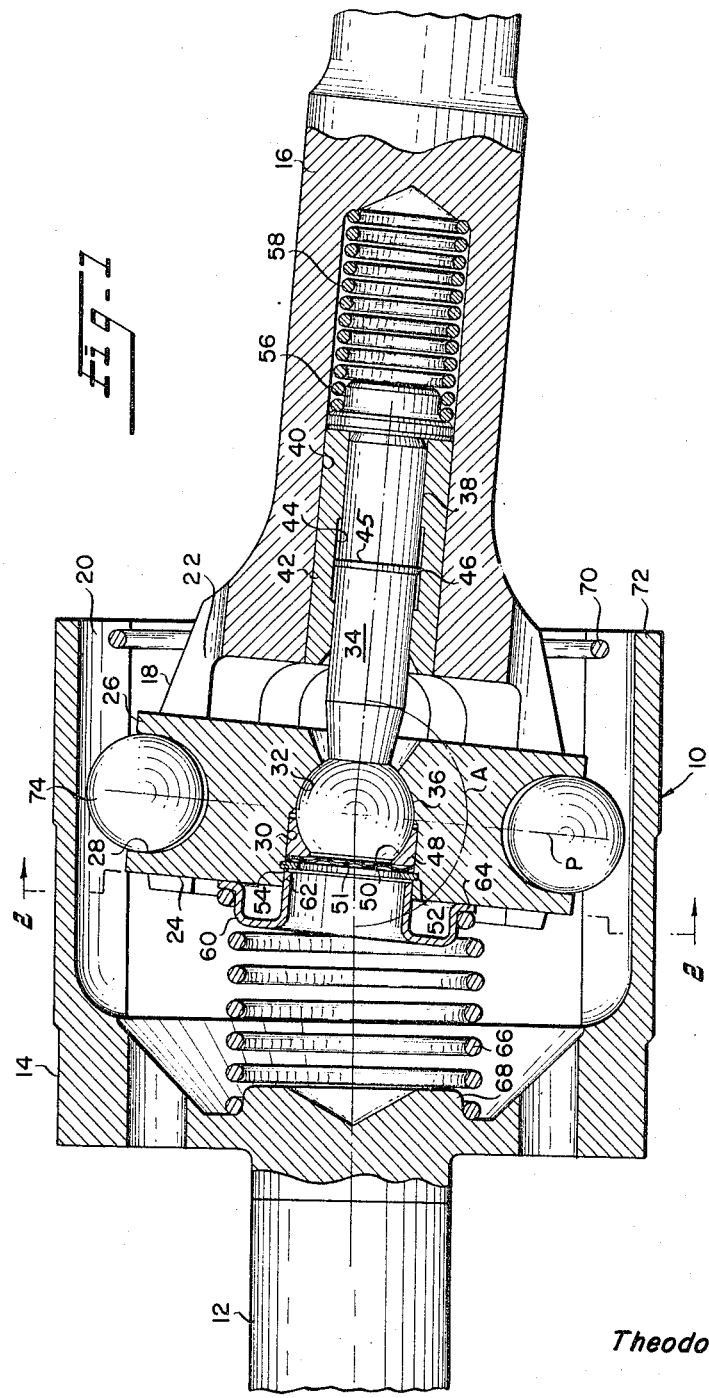
FIGURE 1 illustrates a sectional view of the subject invention in assembled relationship.
Figure 2:
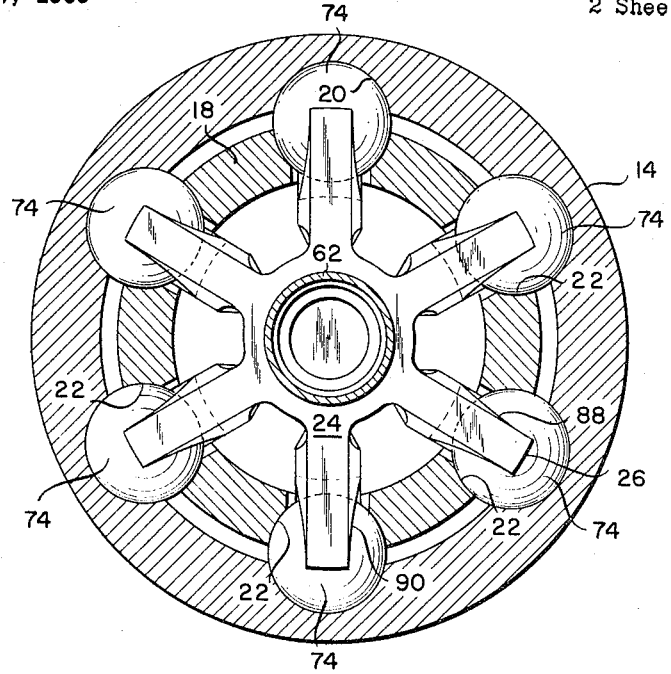
FIGURE 2 is an end view of the arrangement taken on lines 2—2 of FIGURE 1.

Referring now to FIGURE 1, the subject universal joint 10 comprises a first shaft 12 having a securely connected outer member 14 and a second shaft 16 comprising a securely connected inner member 18. The shafts 12 and 16 are shown integral with members 14 and 18, respectively for purposes of illustration only and it should be appreciated that these members can be connected by any conventional means. The outer member 14 contains a plurality of longitudinal inner flutes or races 20, and the inner member 18 comprises a plurality of longitudinally extending outer flutes or races 22. An intermediate spider member 24 comprises a plurality of radially projecting legs 26 having partispherical recesses 28 disposed in the ends thereof. Intermediate member spider 24 further comprises an axially extending slot 30 having an irregular configuration including partispherical seat surface 32. A ball stud member 34 comprising a ball 36 and a shank 38 is located within bore 40 of inner member 18. A guide member or bushing 42 is disposed within bore 40 and comprises an annular groove 44. The shank portion 38 of ball stud 34 comprises an annular groove 45 that snugly receives a snap ring 46 that in turn operates within annular groove 44 of guide member 42. During assembly of shank portion 38 within bushing 42, the snap ring 46 contracts into groove 45 until it springs into engagement with groove 44. The ball portion 36 of ball stud 34 is received within intermediate member 24 and engages partispherical surface 32 of the intermediate member. A bearing member 48 having a partispherical surface 50 is disposed within the intermediate member 24. The bearing member 48 is forced against ball 36 by means of a wave type spring washer 51 that is retained by ring 52 secured in slots 54 in the intermediate member 24. A spring plug member 56 is engaged by a first spring 58. A cup-shaped member 60 comprises an end portion 62 that engages snap ring 52 and a flange portion 64 that engages intermediate member 24, the cup member 60 being biased by a second spring 66 which is received upon a projection 68 of the outer member 14. A stop ring 70 is secured within outer member 14 near the terminal end 72 thereof. A plurality of rotatable members 74 are received within flutes or races 20 and 22 and partispherical recesses 28 to drivingly connect the shafts 12 and 16.

Figure 3:
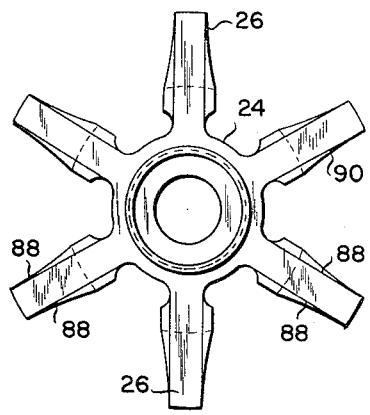
FIGURE 3 is a plan view of the intermediate member utilized in this invention.
Figure 4:
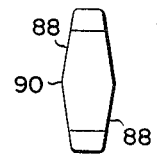
FIGURE 4 is an end view of one of the radially projecting members of the intermediate member shown in FIGURE 3.

Referring now to FIGURES 3 and 4, a preferred configuration of intermediate member 24 is illustrated wherein radial projections 26 comprise a generally diamond-shaped cross-section resulting in flat surfaces 88 which converge to an apex 90 as shown in FIGURE 4. The purpose of this configuration will be described later in the specification when operation of the subject invention is set forth.

In operation of the subject device, torque is transmitted from shaft 12 through outer member 14 to rotatable ball members 74 and through inner member 18 to shaft 16 in a manner well known in this art. Angulation of shaft 12 with respect to shaft 16 results in the intermediate member 24 being angularly disposed within outer member 14 and upon inner member 18 against the force of springs 58 and 66. During such angular displacement of the shafts, the intermediate member 24 is positioned so that a plane P through the center of balls 74 bisects the angle A between the two shafts 12 and 16. The force of spring 58 is somewhat greater than the force of spring 66 so that the member 24 is urged to a neutral position by spring 58. It is significant, however, that the springs 58 and 66 allow axial movement of inner member 18 with respect to outer member 14 as the rotatable members or balls 74 roll in the flutes 20 and 22 while being retained within partispherical recesses 28 of radial projections 26 of the intermediate spider member 24.

To assure rolling movement of the driving rotatable balls 74 during slip of the joint, the stud portion 38 of stud member 34 is snugly received within guide bushing 42 allowing the stud portion to axially slip within the limits of annular slot 44 due to the engagement of snap ring 46. This rolling movement of the rotatable members 74 is advantageous as binding of the sub-assembly including intermediate member 24 is prevented to allow desired axial movement between shafts 12 and 16. In other words, the provision of structure to guarantee rolling slip action in the joint assures a required relative axial movement between the shafts without incurring significant additional frictional forces during shaft angulation.

The configuration of the intermediate member 24, shown in FIGURE 4, is advantageous because of the fact that the radial projections 26 need to be of such shape that the joint can be easily angulated and provide a constant velocity output as previously discussed. The projections 26 comprise a generally diamond-shaped cross-section including flat surfaces 88 and apexes 90 which facilitate angular respective movement of the shafts in a plane of 360 degrees during rolling movement of the balls 74 and, additionally, assure positioning of the intermediate member and the balls 74 in the bisecting plane between the shafts.

From the above discussion, it is readily apparent that the subject invention provides advantageous features in the universal joint art and does so with a relatively simple arrangement of parts. This invention provides the features of constant velocity and axial slip with a minimum of resistance in that the rotatable members are prevented from binding through the utilization of a guide member, and the incorporation of two opposing springs results in a resilient effect that has not been contemplated heretofore in this field.

While the subject invention has been described in connection with two embodiments thereof, it is to be understood that this is by way of illustration only and not by way of limitation and that the scope of my invention is defined solely by the appended claims.

I claim:

1. In a universal joint an outer member connected to a first shaft and having a plurality of longitudinal inner flutes, an inner member connected to a second shaft and having a plurality of longitudinal outer flutes, an intermediate member disposed within said outer member and receiving said inner member, a plurality of rotatable members received within said flutes and said intermediate member, a ball stud member having the ball portion thereof retained within said intermediate member, a guide bushing having an annular slot and being disposed within said inner member and snugly slidably receiving the stud portion of said ball stud member, a stop ring on said stud portion being disposed within said annular slot to limit axial movement of said ball stud with respect to said guide bushing, a first spring within said inner member biasing said stud and said intermediate member to a neutral position, a second spring engaging said outer member and biasing said intermediate member against the force of said first spring, and a stop member secured to said outer member limiting relative axial movement between said inner and outer members.

2. A universal joint for transmitting torque comprising an outer member connected to a first shaft and an inner member connected to a second shaft, said outer member comprising a plurality of longitudinal internal flutes and said inner member comprising a plurality of longitudinal outer flutes in alignment with the inner flutes of said outer member, an intermediate member comprising a plurality of legs extending radially outwardly in alignment with said grooves in said outer member, a partispherical recess in each of said outwardly extending legs, a plurality of rotatable members disposed within said partispherical recesses and in engagement with said inner and outer longitudinally extending flutes, a ball stud member mounted within a partispherical recess in said intermediate member, a bearing member located within said recess in said intermediate member and retained therein by a snap ring disposed in a slot in said intermediate member, a guide bushing received within a bore of said inner member, said guide bushing having an annular groove receiving a snap ring secured to the shank of said ball stud member to limit axial movement thereof, a first spring member engaging said ball stud member to bias said intermediate member to a neutral position, a cup-shaped member engaging both said snap ring retaining said bearing member and said intermediate member, a second spring engaging said outer member and said cup-shaped member to bias said intermediate member in a direction opposite to the force exerted by said first spring member, and a stop member secured to said outer member to limit axial movement of said inner member relative to said outer member, said intermediate member and said rotatable members being angularly disposed to bisect the angle between said shafts when said assembly is disposed in an operational position out of normal axial alignment.

3. An axially slidable universal joint comprising an outer member having a plurality of circumferentially spaced grooves, an inner member movable axially and angularly relative to the outer member and having a plurality of circumferentially spaced grooves, a plurality of torque transferring elements received within the grooves and interconnecting the inner and outer members, positioning means for positioning the torque transferring elements in a single torque transferring plane, a connecting element universally interconnecting one of the members and the positioning means, first resilient means engaging the said one member and the connecting element to bias the connecting element and the positioning means axially of the said one member, and second resilient means engaging the other said member and the positioning means to bias the positioning means axially of the said other member, the first and second resilient means cooperating to center the positioning means axially of the members during relative axial movement therebetween.

4. The universal joint recited in claim 3, wherein the connecting element is slidably carried by the said one member and is universally connected to the positioning means to locate the positioning means concentrically with the said one member during relative axial movement therebetween.

5. The universal joint recited in claim 3, wherein the first resilient means engages the inner member and biases the connecting element and the positioning means axially outwardly thereof, and the second resilient means engages the outer member and biases the positioning means axially outwardly thereof.

6. The universal joint recited in claim 5, wherein the connecting element is coaxial with the inner member and is axially slidable relative thereto, the connecting element being universally connected to the positioning means to locate the positioning means concentrically with the inner member and maintain the concentricity during relative axial and angular movement between the members.

7. The universal joint recited in claim 6, wherein the universal connection between the connecting element and the positioning means lies in the said single torque transferring plane to thereby permit constant velocity operation of the universal joint during angulation and relative axial movement between the members.

8. The universal joint recited in claim 3, including means to limit relative axial movement between the members.

References Cited by the Examiner

UNITED STATES PATENTS

| | | | |
|---|---|---|---|
| 1,847,677 | 3/1932 | Sternbergh | 64—21 |
| 2,313,279 | 3/1943 | Suczek | 67—7 X |
| 2,352,776 | 6/1944 | Dodge | 64—21 |
| 2,862,373 | 12/1958 | Gibson | 64—21 X |

FRED C. MATTERN, JR., *Primary Examiner.*

H. C. COE, *Assistant Examiner.*